Dec. 20, 1955 W. W. MOE 2,727,940

ELECTRONIC MASKING METHOD AND APPARATUS

Filed June 12, 1951 2 Sheets-Sheet 1

INVENTOR.
WILLIAM WEST MOE
BY
Campbell, Brumbaugh, Free & Graves
HIS ATTORNEYS

ELECTRONIC MASKING METHOD AND APPARATUS

Filed June 12, 1951 2 Sheets-Sheet 2

INVENTOR.
WILLIAM WEST MOE
BY
Campbell, Brumbaugh, Free & Graves
HIS ATTORNEYS

United States Patent Office 2,727,940

Patented Dec. 20, 1955

2,727,940

ELECTRONIC MASKING METHOD AND APPARATUS

William West Moe, Stratford, Conn., assignor to Time, Incorporated, New York, N. Y., a corporation of New York Application June 12, 1951, Serial No. 231,166

21 Claims. (Cl. 178—5.2)

This invention relates to methods and apparatus for making reproductions in color of colored originals. More particularly, it has to do with new and improved electronic systems of this character that are capable of compensating in a simple yet highly effective manner for factors such as deficiencies in printing inks, or other color reproducing media, for example, which tend to produce untrue color reproductions.

Electronic systems have already been devised for reproducing multicolor records from colored originals. In a typical apparatus, optical means are employed for scanning successive elemental areas of a colored original in order to derive three sequences of signals, each sequence being representative of one primary color value at successive corresponding elemental areas of the original. These three signals may be passed through three separate channels the output signals of which are utilized to expose the color separation negatives from which the color printing plates are made according to known methods.

Color reproduction systems of the above character have also included electronic means for effecting so-called "masking" corrections by modifying a signal in one channel as a function of signals from one or more other channels. More specifically, with signals in the three channels representing the primary printing colors of yellow, magenta and cyan, respectively, it has been common practice to modulate the yellow signal by a function of the magenta signal; to modulate the magenta signal by a function of the cyan signal; and to compress the cyan signal as a function of its own value, thereby achieving a more pleasing end result than could be obtained when these masking corrections were not made.

It has been found, however, that the above masking corrections are not entirely satisfactory. The correction in the cyan channel, for example, affords insufficient cyan contrast in the blue and green areas of the colored original, although it is effective for neutral or red areas. Further, the correction in the magenta channel resulted in the printing of too much magenta ink in the yellow and orange areas of the reproduction so that an undesirable reddish cast was sometimes imparted to the finished product.

Accordingly, it is one object of this invention to provide an electronic color correction system which affords a needed increase in the contrast of the cyan only in the blue and green picture areas, which may appear at random in any given color reproduction.

Another object of the invention is to provide a selective masking system whereby the relative color intensities control automatically the masking formula applied.

A further object of the invention is to provide an electronic color correction system in which effective masking corrections are made without imparting an undesirable reddish cast to the finished reproduction.

According to the invention, improved contrast of the cyan in blue and green picture areas is obtained by modifying the cyan signal as a function of the instantaneous maximum of the three color signals in the three color channels. This results, in effect, in the cyan signal being compressed by a function of itself only when the cyan signal predominates in value, whereas the magenta masking signal and the yellow masking signal may mask or modulate the cyan signal only at such times as either of the former predominates in value. Moreover, the improvement in contrast in the cyan in the blue and green picture areas is achieved without any change in the contrast in neutral or red areas. The printing of excess magenta ink in yellow and green picture areas is avoided, according to the invention, by masking the magenta signal by the sum of functions of the signals in the cyan and magenta channels. Still better results may be achieved by masking the magenta signal by the sum of functions of the cyan and yellow signals. In either case, means is provided, according to the invention, for preventing any reduction in magenta masking by cyan.

In a preferred embodiment, the magenta signal is masked by the cyan signal at all times. However, in yellow picture areas, i. e. when the yellow intensity in the original is high and the cyan and magenta intensities are low, the magenta is partially masked by the yellow signal. This form of the invention appears to give the best overall correction.

The invention may be better understood with reference to the following specification describing several representative embodiments of the invention, referring to the accompanying drawing, in which.

Figure 1:
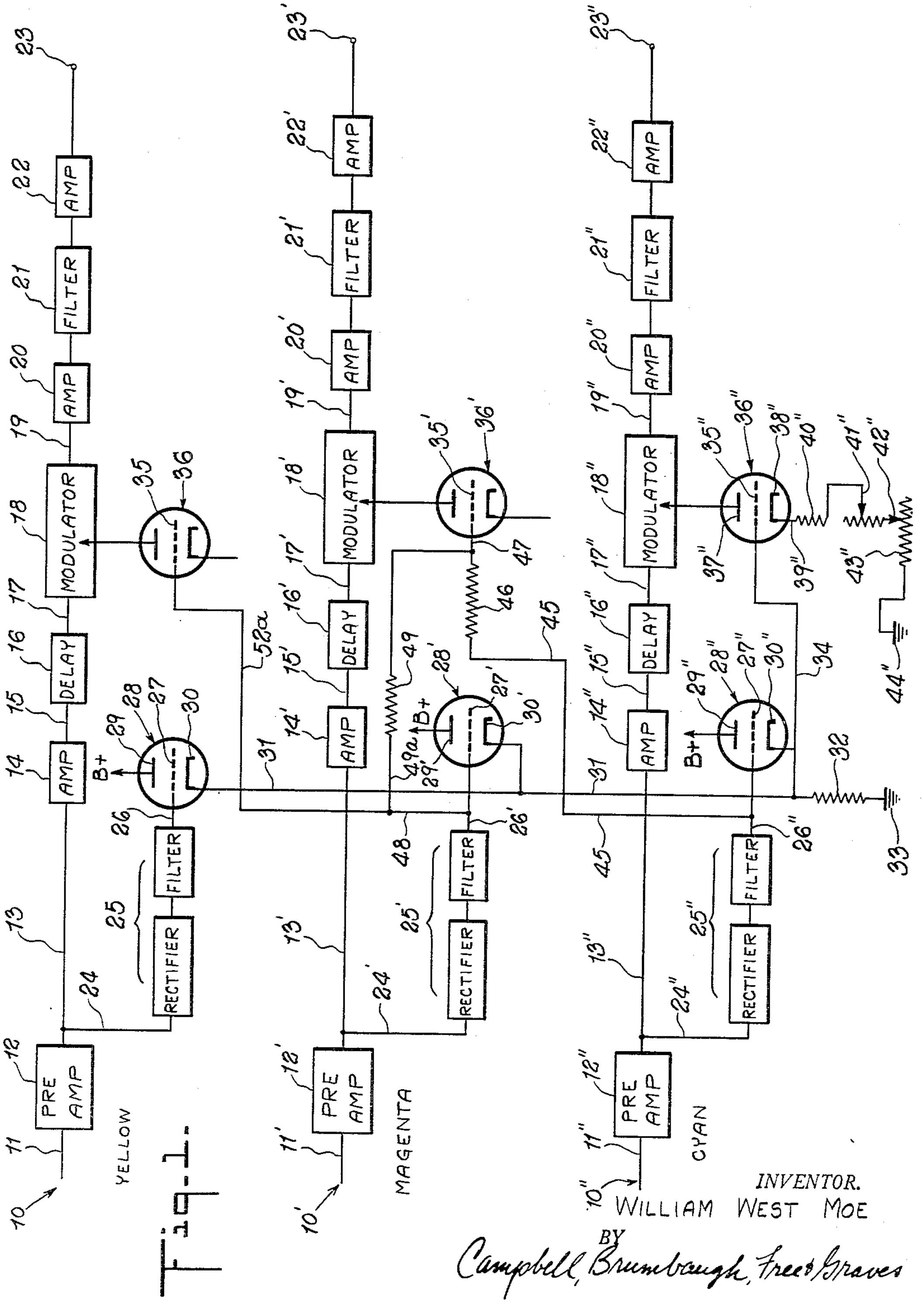
Fig. 1 is a schematic diagram of a portion of a three channel color printing system embodying masking means constructed according to the invention.

Referring now to Fig. 1, the invention is shown as embodied in a three channel masking amplifier system which may be of the type illustrated in copending application Serial No. 14,008, filed March 10, 1948, for "Method and Apparatus for Making Color Separation Negatives for Four Color Reproductions," for example, comprising a yellow channel 10, a magenta channel 10′ and a cyan channel 10″. These three channels are identical so that only the yellow channel need be described in detail herein, like components in the other two channels being assigned like prime and double prime reference characters, respectively.

Referring now to the yellow channel 10, there is shown an input conduit 11 which receives a yellow signal derived from a scanning device which forms no part of this invention. Scanning devices suitable for the purpose are well known and are adapted to provide a carrier signal for each channel corresponding to the color assigned thereto. The conduit 11 is connected to a preamplifier 12 having an output conduit 13 which connects to a linear amplifier 14.

The output of the amplifier 14 is fed through a conduit 15 into a conventional time delay circuit 16 from which the signal is transmitted by means of conduit 17 to a signal modulator device 18 more fully described below. The output of the modulator device 18 is fed by a conduit 19 into amplifier 20, the output of which is passed through a band pass filter 21 and thence to an amplifier 22 having terminal output means 23 which may be connected to conventional means for producing a color separation negative in a manner well known in the art. Preferably the channel signals, for purposes of efficient circuit design, are A. C.

For color correction purposes, as required to compensate for known deficiencies in the printing inks, a plurality of D. C. voltages hereinafter called masking voltages are derived from the three channels. The value of each masking voltage is a function of the signal intensity in the channel from which it is derived. In the case of the yellow channel, the masking voltage is derived by means of a network including a conduit 24 connected at the output side of the preamplifier 12, which feeds the yellow signal to a conventional rectifier and filter network 25. The output of the rectifier and filter 25 is the masking voltage. The masking voltages from the magenta and cyan channels are derived in a similar manner.

As indicated above, it has been found that a needed increase in the contrast of the cyan in blue and green picture areas can be obtained without affecting the contrast in neutral or red areas by masking the cyan signal as a function of the instantaneous maximum masking voltage in any of the three color channels. This may be accomplished by feeding the output of the rectifier and filter 25 in the yellow channel 10 by means of a conductor 26 upon a control grid electrode 27 of a high gain triode 28. The plate electrode 29 of the triode 28 is connected to a suitable source of positive potential B+ (not shown) and the cathode 30 is connected by means of a conductor 31 to a cathode resistor 32 grounded at 33. Thus, the triode 28 is connected as a cathode follower, and each of the corresponding cathode followers 28′ and 28″ is connected in parallel therewith. It will be apparent that the instantaneous voltage across the cathode resistor 32 will be the maximum of the three masking voltages developed as the outputs of the rectifiers 25, 25′ and 25″, respectively.

The instantaneous maximum masking voltage appearing across the cathode resistor 32 is fed by means of a conductor 34 to a control grid 35″ of a triode 36″, the plate electrode 37″ of which is connected to a source of energizing potential (not shown) through the modulator device 18″. The cathode 38″ of the triode 36″ is connected by means of a conductor 39″ to a fixed resistor 40″ connected in series with a variable resistor 41″ which is in turn connected to a slide tap 42″ of a potentiometer 43″ grounded at 44″.

The modulator devices 18, 18′ and 18″ each comprise a thyrite modulator system such as disclosed in copending application Serial No. 108,290, entitled "Modulator System," filed August 3, 1949, which effects compression of a carrier signal in a given channel in accordance with a nonlinear or exponential equation, all as disclosed in the said application.

In operation, the maximum instantaneous masking voltage will be selected from among the three channels and fed into the modulator 18″ of the cyan channel 10″ by means of the circuit described, thereby to provide a highly desirable increase in the contrast of the cyan in the blue and green picture areas in the final reproduction.

As stated, the masking of the magenta signal by the cyan masking signal, in a manner analogous to photographic masking results in too much magenta ink being printed in yellow and green areas of the final reproduction. A material improvement is effected, according to the invention, by masking the magenta signal by the sum of functions of the magenta and cyan masking voltages. This may be accomplished, for example, by connecting a voltage divider comprising the series connected resistors 46 and 49 to the output of the rectifier and filter 25″ by a conductor 45 and to the output of the rectifier and filter 25′ by the conductors 49a and 48. The common point 47 between the resistors 46 and 49 is connected to the control grid 35′ of the tube 36′ which energizes the modulator 18′ in the yellow channel 10′.

With the magenta masking circuit described above, the excessive reddish color appearing in the yellow and green areas of the final reproduction is diminished, so that an improved print results.

The grid 35 of the tube 36 of the yellow channel may be connected by a conductor 52a to the output of the rectifier and filter 25′ so as to mask the yellow signal by the magenta masking signal.

Figures 2, 3:
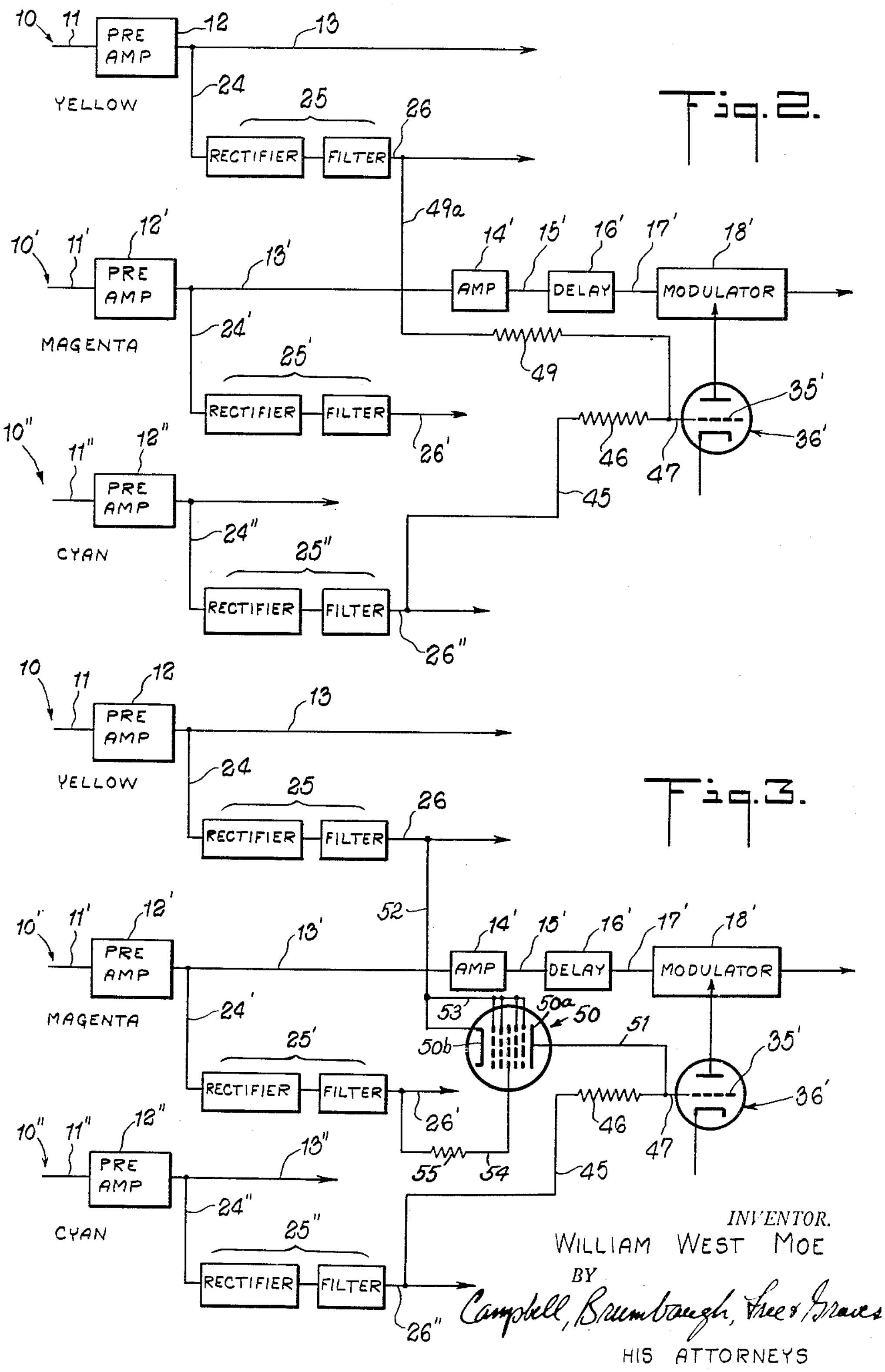
Fig. 2 illustrates diagrammatically another way of masking the magenta signal in accordance with the invention.
Fig. 3 is a schematic diagram of a modification of the system shown in Fig. 2.

Further improvement can be realized by masking the magenta signal as a function of the cyan and yellow signals. As shown in Fig. 2, this may be accomplished by connecting the conductor 49a to the output of the rectifier and filter 25. A unidirectional device such as a diode, for example, may be inserted in the conductor 49, the diode being polarized to permit electron flow from the cyan to the yellow channel, this arrangement serving to prevent division of the masking voltage from the cyan channel at such times as the cyan masking voltage is greater than the yellow masking voltage.

It has been found that excellent results may be achieved by masking the magenta signal by 50% from the cyan signal in all color areas of the original except yellow where about a 25% mask of the magenta by the yellow should be provided. In order to provide this selective masking, the modified circuit shown in Fig. 3 may be used. In this circuit an electron tube 50, such as the type 6BE6, for example, is connected to receive the outputs of each of the rectifier filters 25, 25′ and 25″ of the three color channels. More specifically, the plate electrode 50a of the tube 50 is tied by a conductor 51 directly to the grid 35′ of the tube 36′ of the magenta modulator system 18′. It will be recalled that the grid 35′ also receives voltages from the rectifier-filter 25″ of the cyan channel 10″ through the resistor 46. The cathode 50b of the tube 50 is tied by the conductor 52 to the conductor 26 which receives the output of the rectifier-filter 25 in the yellow channel 10. The tube 50 is provided with a series of five grids, the first, second, fourth and fifth of which are connected to the cathode 50b by a conductor 53 and the third of which is connected by a conductor 54 including a series resistor 55 to the output of the rectifier-filter 25′ in the magenta channel 10′. It has been found that good results are obtained if the resistor 46 has a value of 560,000 ohms and the resistor 55 a value of 680,000 ohms.

With the tube 50 connected as shown, a substantially open circuit obtains between the rectifier-filter 25 in the yellow channel 10 and the grid 35′ of the tube 36′ in the magenta channel unless the third grid of the tube 50 is made positive with respect to its cathode (by means of the voltage derived from the magenta rectifier 25′ through the series resistor 55), and the plate is made positive with respect to its cathode (as a result of the voltage derived from the rectifier-filter 25″ through the resistor 46). In other words the tube 50 will conduct when the voltage derived from the yellow channel is low relatively to the voltages from the cyan and magenta channels 10″ and 10′, respectively. Since a low relative voltage from the yellow channel corresponds to high yellow content in the original it will be apparent that the tube 50 becomes conducting only in yellow picture areas.

When the tube 50 conducts, the positive voltage applied to the grid 35′ of the tube 36′ from the channel 10″ is reduced due to the current drawn by the tube 50. In these circumstances less current is drawn through the modulator 18′ in the magenta channel by the tube 36′, and the modulator output will be increased, calling for less magenta in the final picture in the yellow areas. The amount of masking of the magenta signal by the yellow signal may of course be adjusted by varying the resistance values of the resistors 46 and 49.

The invention thus provides a novel and highly effective color correction system for making color separation negatives and the like. By masking the cyan signal as a function of the instantaneous maximum signal in the three color channels, improved contrast in blue and green picture areas is obtained, without appreciable change in contrast in neutral or red areas. Further, by masking the magenta signal by the sum of functions of the cyan and magenta or the cyan and yellow masking signals, the printing of excess magenta ink in yellow and green areas is avoided.

The several embodiments of the invention described in detail above are presented as being illustrative rather than limiting, and it will be apparent to those skilled in the art that numerous changes in the specific circuits may be effected within the spirit of the invention disclosed. Thus, for example, the various channel components may be rearranged in any desired manner so long as the required masking voltages are properly fed into the appropriate color channels for modulation in accordance with the teaching of this invention. Also, in the forms of the invention described and illustrated, the several channels carry signals which are directly proportional to color values in negatives. Obviously the invention may be used in a system for forming positives, in which case the channels would carry signals which would be directly proportional to color values in positives.

Accordingly, it is to be understood that the invention is to be determined in scope by the appended claims.

I claim:

1. The method of masking the electrical signals in an electronic color-reproducing system having at least three signal channels, said channels carrying a sequence of signals representative of primary color values of elemental areas of the original, the method comprising deriving a succession of voltages from two of said channels, modulating the signal in one of the channels by the sum of functions of the two voltages derived, deriving instantaneous maximum signal from among the signals in the three channels and continuously modulating the sequence of signals in only one of the channels by a value which is a function of the instantaneous maximum signal.

2. The method of masking the electrical signals in an electronic color-reproducing system having at least three signal channels, said channels carrying a sequence of signals representative of primary color values including yellow, magenta and cyan of elemental areas of the original, the method comprising deriving a sequence of voltages from the cyan and magenta channels and modulating the signal in the magenta channel by the sum of functions of the derived voltages, including deriving the instantaneous maximum signal from among the signals of all of the channels and modulating the sequence of signals in only the cyan channel by a value which is a function of the instantaneous maximum signal.

3. The method of masking the electrical signals in an electronic color-reproducing system having at least three signal channels each carrying a sequence of signals representative of color values in the original, said colors including the primary colors yellow, magenta and cyan or the like, the method comprising deriving a modulating signal from each of the channels and modulating the magenta channel signal by a function of the yellow and cyan signals at such times as the values of the cyan and magenta signals exceed the value of the yellow signal including deriving the instantaneous maximum signal from among the signals of all of the channels and modulating the sequence of signals in only the cyan channel by a value which is a function of the instantaneous maximum signal.

4. In apparatus for masking the signals in a multichannel color-reproducing system, said channels carrying a sequence of signals representative of color values in the original, the combination of a signal modulator device in at least one of said channels, means for selecting the instantaneous maximum signal from among the signals in all of the channels prior to correction thereof, and means for feeding said instantaneous maximum signals into said modulator, said modulator being adapted to modulate the uncorrected signal in said one channel as a function of the said instantaneous maximum signal to produce a corrected signal in said one channel.

5. Apparatus as set forth in claim 4, including at least three channels, each carrying a sequence of signals representative of the primary color values of elemental areas of the original.

6. Apparatus as set forth in claim 5, said channels including yellow, magenta and cyan, the said one channel having the signal modulator device therein being the cyan channel.

7. In apparatus for masking the electrical signals in the multi-channel color-reproducing system, and including at least three color channels, each carrying a sequence of signals representative of the primary color values of elemental areas of the original, means to derive a succession of voltages from the first channel representing the color signals therein, means to derive a succession of voltages from the second channel representing the color signals therein, modulator means connected to receive the voltages of the first and second channels, and means connecting the modulator to the third channel to modulate the signals therein by the sum of functions of the two derived voltages.

8. Apparatus as set forth in claim 7, said first, second and third channels carrying signals respectively representative of yellow, cyan and magenta, whereby the signal in the magenta channel is modulated by the sum of functions of the derived voltages from the yellow and cyan channels.

9. Apparatus for masking the electrical signals in a multichannel color-reproducing system, said channels carrying a sequence of signals representative of color values in the original, in combination a plurality of electron tubes associated one with each of said channels, said tubes having control grid and cathode electrodes, means connecting the control grid of each of said tubes to receive a signal from its corresponding channel which is a function of the signal in that channel, means connecting said cathode electrodes in parallel and to common resistor means, and modulating means in only one of said channels connected to receive the signal developed across said resistor means, the signal in said one channel thereby being modulated as a function of the instantaneous maximum signal selected from among the signals of all of the channels.

10. Masking apparatus according to claim 9 said channels accommodating signals corresponding to yellow, magenta and cyan, respectively, and said one channel comprising the cyan channel.

11. Apparatus for masking the electrical signals in a multichannel color-reproducing system, including yellow, magenta and cyan channels, including in combination, a modulator device connected in said magenta channel for modulating the signal therein, means for deriving a sequence of modulating voltages from the cyan channel comprising a function of the instantaneous cyan color signals therein, means including a series connected resistor connecting said modulator device to receive the modulating voltage from the cyan channel, means for deriving a modulating voltage from said magenta channel, and means including a series connected resistor connecting said modulator device to receive the modulating signal from the magenta channel, the color signal in said magenta channel thereby being modulated by the sum of functions of two voltages.

12. The apparatus as set forth in claim 11 including in combination a second modulator device in said yellow channel and means connecting said second modulator device to receive the modulating voltage from said magenta channel, thereby to modulate the signal in the yellow channel.

13. Apparatus as set forth in claim 12 including means for selecting the instantaneous maximum signal from among the signals in all of the channels and means for modulating the signal in the cyan channel by a function of said instantaneous maximum signal.

14. Apparatus for masking the electrical signals in a multichannel color-reproducing system, the channels including yellow, magenta and cyan, comprising a modulator device for modulating the signals in the magenta channel, means for deriving a sequence of modulating voltages from the cyan channel representing the instantaneous cyan color signals therein, means including a series connected resistor connecting the said modulator device in the magenta channel to receive modulating voltages from the cyan channel, means for deriving modulating voltages from said yellow channel, and means including a unidirectional current conducting device connecting the said modulator device in the magenta channel to receive modulating signals from the yellow channel.

15. Apparatus as set forth in claim 14 including a plurality of electron tubes associated one with each of said channels, said tubes having control grid and cathode electrodes, means connecting the control grid of each of said tubes to receive signals from its corresponding channel which are a function of the signals in that channel, means connecting said cathode electrodes in parallel and to common resistor means, and modulating means in said cyan channel connected to receive the signals developed across said resistor means, the signals in said cyan channel thereby being modulated as a function of the instantaneous maximum signals selected from among the signals of all of the channels.

16. Apparatus for masking the electrical signals in a multichannel color-reproducing system including yellow, magenta and cyan channels carrying signals inversely proportional to color values in the original, a modulator device for modulating the signals in the magenta channel, means for deriving modulating voltages from each of the channels, said voltages representing respectively the signals in the three channels, means including a series connected resistor connecting the said modulator device in the magenta channel to receive modulating voltages from the cyan channel, an electron tube having plate, grid, and cathode electrodes, means connecting the plate electrode to the modulator device in the magenta channel, the grid electrode to receive modulating voltages from the magenta channel and the cathode to receive modulating voltages from the yellow channel, said tube being constructed and arranged to conduct only at such times as the voltages on the plate and grid electrodes exceed that on the cathode, and to provide an open circuit at other times, thereby to permit the magenta signals to be modulated by a function of the yellow signals in yellow areas of the original and to be modulated by a function of the cyan signals in all other areas of the original.

17. Apparatus as set forth in claim 16 including a modulator device for modulating the cyan signal, and means responsive to the instantaneous maximum modulating voltages selected from among the three channels for operating the cyan modulator device.

18. Apparatus for masking the signals in a multichannel color reproducing system including yellow, magenta and cyan channels, comprising, means for deriving a sequence of modulating signals from the cyan channel which are a function of the instantaneous cyan color signals therein, means for deriving a sequence of modulating signals from the yellow channel which are a function of the instantaneous yellow signals therein, and modulator means associated with the magenta channel and connected to receive said modulating signals from the yellow and cyan channels and responsive thereto for modulating the signals in the magenta channel as a function of both the yellow and cyan signals.

19. Apparatus as set forth in claim 18, said modulator means being connected to receive said modulating signals by a circuit including voltage divider means connected between the said means for deriving modulating signals from the cyan channel and the said means for deriving modulating signals from the yellow channel, said modulator means thereby receiving a modulating signal which is the sum of functions of the signals in the cyan and yellow channels.

20. Apparatus as set forth in claim 18 including means for selecting the instantaneous maximum signal from among the signals in all of the channels, and second modulator means associated with said cyan channel for modulating the signal in said cyan channel by function of said instantaneous maximum signal.

21. Apparatus as set forth in claim 18 said modulator means associated with the magenta channel being responsive to yellow and cyan signals to mask the magenta signal by 50 per cent from the cyan signal at such times as the cyan and magenta predominate in the color areas of the original and to mask the magenta signal by 25 per cent from the yellow signal when the yellow predominates in the color areas of the original.

References Cited in the file of this patent

UNITED STATES PATENTS

| | | |
|---|---|---|
| 2,253,086 | Murray | Aug. 19, 1941 |
| 2,286,730 | Hall | June 16, 1942 |
| 2,413,706 | Gunderson | Jan. 7, 1947 |
| 2,560,567 | Gunderson | July 17, 1951 |